April 22, 1941.　　　J. P. LAWLOR　　　2,239,612
IRON REMOVAL APPARATUS
Filed June 13, 1940
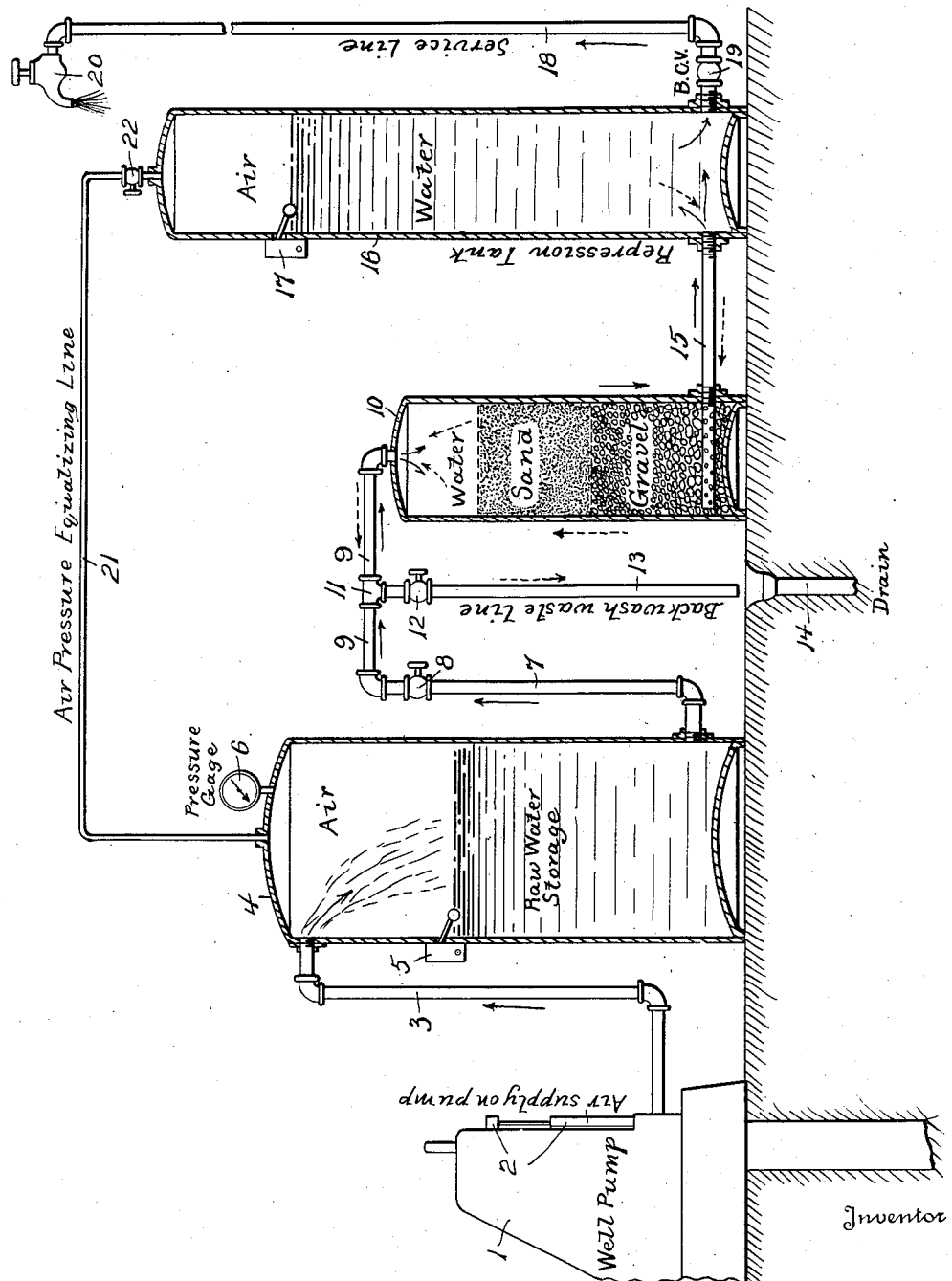
Inventor
Joseph P. Lawlor
By Dieterich & Rutley
Attorneys.

Patented Apr. 22, 1941

2,239,612

UNITED STATES PATENT OFFICE 2,239,612

IRON REMOVAL APPARATUS

Joseph P. Lawlor, Ames, Iowa

Application June 13, 1940, Serial No. 340,383

8 Claims. (Cl. 210—26)

My invention relates to means for the removal of iron from well water supplies.

Many well waters contain iron in objectionable quantities. Various methods have been devised for the removal of the iron. The general practice—and the same is followed here—is to oxidize the iron in the water, changing it from a soluble to an insoluble state, then passing the water through an ordinary sand filter retaining the insoluble iron precipitate on the filter sand. Another method commonly used is to pass the water through a highly oxidized mineral causing oxidation and precipitation at the same time. The third method of removal is by base exchange. The second and third methods require the use of chemicals resulting in considerable care and attention. The teaching herein prescribed is along the lines of the first method, namely, oxidation by aeration, then filtering with standard filters.

Heretofore, however, this practice has been limited in its possibilities owing to the fact that the filter must be back-washed occasionally by reversing the flow of water through the filter, thereby floating out the residue collected on the filter sand. This back-wash requires a high flow rate and it has been expensive to build a unit with storage that would permit satisfactory back-wash flow rates.

Another objection to this method as heretofore practiced lies in the fact that the filter itself had to be sufficiently large to accommodate the capacity of the well pump. For example, if the well pump delivered ten gallons per minute, the filter itself would have to be sufficiently large to efficiently filter ten gallons per minute. The result was that the cost of the plant for domestic and industrial use was out of proportion and too expensive to be considered practical by the majority of households and small industries using water high in iron.

The third objection to the old conventional type has been the complication of valves and piping system necessary for operation and back-wash.

My invention, therefore, has for its object the overcoming of all of the above mentioned objections, enabling the use of a smaller filter than heretofore through the utilization of storage space on both the inlet and outlet sides of the filter, and avoiding the necessity for using additional air equipment for the proper back-wash of the filter.

Other objects will in part be obvious and in part be pointed out hereinafter.

To the attainment of the aforesaid objects and ends the invention still further resides in the novel details of construction, combination and arrangement of parts, all of which will be first fully described in the following detailed description, and then be particularly pointed out in the appended claims, reference being had to the accompany drawing, in which the figure is a diagrammatic view of an iron removal plant according to my invention.

In the drawing, 1 is the usual power-driven well pump having means 2 to supply air to the water as it leaves the pump to flow through a pipe 3 into a pneumatic pressure tank 4 for storage of raw water, and maintaining the necessary pressure for service lines.

Under the practice heretofore employed the pipe 3 connects to the the bottom of tank 4, but when my invention is used the pipe 3 is connected to tank 4 near its top so that the water will fall through the air in the tank so as to induce oxidation of the ferrous iron in order to change it from a soluble to an insoluble state.

The tank 4 has an air space in the top part and is provided with the usual pressure gauge 6 and with a float-operated air release valve 5 of conventional form.

A pipe 7 is connected to the tank 4 near its bottom and conveys the water from that tank via a shut-off valve 8 and cross-pipe 9 to the filter 10 where it delivers into the top of the filter. The pipe 9 has a T 11 to which a waste pipe 13, having a shut-off valve 12, is connected, the waste pipe 13 discharging into a suitable drain 14.

All of the aforementioned articles (1 to 14) are in accordance with standard practice for small pneumatic pressure systems, except that I have changed the discharge line 3 from the pump to deliver the water into the tank 4 at the top instead of at the bottom, and I use a smaller filter 10, than has heretofore been possible.

The filter 10 is a sand-gravel type filter having a freeboard or water space above the filter sand so as to permit the sand to rise during backwash. Water leaves the filter through the under drain duct 15 and is conducted into the repression tank 16.

The service pipe 18 is connected to tank 16 near its bottom and has a back-check valve 19 (B. C. V.) adjacent the tank and one or more faucets 20 at its delivery point or points.

The tank 16, like the tank 4, has an air space at the top. These air spaces (of tanks 4 and 16) are connected by, and normally communicate through, an air-pressure-equalizing pipe 21, there being a shut-off valve 22 in the line (preferably located adjacent tank 16). Tank 16 is also provided with a float-operated air release valve 17 similar to the valve 5, the valves 5 and 17 being of any approved construction.

Normally valve 22 is closed, valve 8 is open, and valve 12 is closed. When faucet 20 is opened water starts movement through pipe 18 from two sources, namely, tank 16 and tank 4. It is obvious that when faucet 20 is closed for a period of time the pressures in tanks 4 and 16 become balanced. Consequently when faucet 20 is opened, tanks 4 and 16 start to feed into pipe 18, repression tank 16 feeding direct and tank 4 feeding through the filter 10.

Assume that faucet 20 is opened so as to deliver ten gallons per minute. This will not result in a ten-gallon-per-minute rate of travel through filter 10 because of the available storage in repression tank 16. The reduced pressure will, however, start a flow through filter 10 at the rate of a little less than half the rate at which water is drawn. In other words, the rate of flow through the filter would be reduced from ten gallons per minute down to four or five gallons per minute. After faucet 20 is closed water from tank 4 will continue to travel in to repression tank 16 via the filter 10. For example, assume that faucet 20 is opened for one minute and then closed, filter 10 would start operation as soon as faucet 20 is opened. After faucet 20 is closed the water continues to flow from tank 4 to repression tank 16, through filter 10, for a considerable period of time, or until the pressure is again equalized in tank 4 and repression tank 16. During the above operation of opening and closing faucet 20, pump 1 may or may not be operating; that is immaterial. Owing to the fact that the filter is functioning when service valves or faucets are closed it is obvious that filter 10 can be much smaller than would be necessary without the use of repression tank 16. This is an improvement; the smaller the filter necessary, the less expensive the installation.

In due time a heavy iron precipitate is collected on top of filter sand and must be removed. This is done by back-washing the filter sand. By back-wash is meant the reversing of the flow of water in filter 10 so as to travel upward, lifting off the precipitated iron and carrying it to waste. The back-washing of this plant is accomplished in the following simple manner.

Close valve 8. Open valve 12. Open valve 22. The filtered water stored in tank 16 then travels back through pipe 15, up through filter tank 10, out pipe 9, through valve 12 and pipe 13 to waste. The air stored in tank 4 contributes to the pressure in tank 16 when valve 22 is opened. The air pressure is sufficient to force water from tank 16 up through filter 10. By the time the water in tank 16 has been exhausted the filter is sufficiently clean to put back into operation.

Putting the unit back into operation then merely requires the following: Close valve 22. Close valve 12. Open valve 8. By the time this back-wash operation is completed pressure will have dropped in tank 4 sufficient to start pump 1. As the water and air pressure builds up in tank 4, approximately one-half of the water pumped moves slowly through filter 10 into repression tank 16. If pump 1 is delivering ten gallons per minute, filter 10 is operating at approximately five gallons per minute as half of the water pumped is being stored in tank 4 and the balance is in the repression tank 16. The method of using repression tank 16 for balancing the flow of water through the filter is one of the new features of my invention. The method of using repression tank 16 for back-washing, utilizing air from tank 4 through line 21, is also a new feature. Applicant knows of no other system where air from a storage tank is transferred to another tank to supply pressure for back-wash. This back-washing operation is performed about twice a week and requires less than two minutes of time. Applicant knows of no other system that requires less time and attention. Its only operating expense is the extra water that is pumped and used for back-washing, which is a very small quantity. This system is highly economical and simple—so inexpensive, in fact, that it can be easily adapted for household use. Although this plant is now designed and being built for domestic use on farms and other homes having their own well water supply, it could also be used in connection with city service lines by eliminating the well pump and substituting therefor city water and retaining an air supply pump. A simple and inexpensive iron removal plant for household use is found here. It is accomplished by creating a slow rate of flow through the filter, thereby making it possible to use a smaller filter. It is further accomplished by providing means for back-washing the filter adequately with clean filtered water that is passed up through the filter sand by means of air storage already existing in both tanks, said air being necessary otherwise to maintain a pressure on the service lines during normal operation. It is made less expensive by the elimination of a number of valves that are ordinarily used. It is less expensive than other types where chemical treatment is required because in this plant no chemicals whatsoever are necessary for the removal of iron under ordinary circumstances.

I have herein described and shown in the accompanying drawing, the preferred embodiment of my invention. I wish it understood, however, that modifications of the same may be made without departing from the spirit of the invention and within the scope of the appended claims.

From the foregoing, taken in connection with the accompanying drawing, it is thought the construction, operation and advantages of my invention will be clear to those skilled in the art.

What I claim is:

1. In an iron removal system, a raw water storage tank having a water space and having a compressed air space above the water level in the tank, means for admitting water and air into said tank, a repression tank having a water space and also having a compressed air space above the water level in that tank, a water service line connected to the water space of said repression tank and having a back check valve, a filter, a pipe for conveying water from the water space of said raw water tank into the top of the filter, a pipe for conveying the filtered water from the filter into the water space of the repression tank, a back-wash line connected to the pipe which conveys the water from the raw water tank to the filter and having a shut-off valve, there being another shut-off valve in the pipe between the raw water tank and the place of connection therewith of said back-wash line, an air pressure equalizing line connecting the air space of the raw water tank with the air space of the repression tank, and a shut-off valve in said air pressure equalizing line.

2. In a system of the class described, the combination, comprising a source of water and air under pressure, a compressed air raw-water tank having an air space above the water, a pipe connecting said source with said air space to deliver the water and air through the air in said air space, a compressed air repression tank having a water space and having an air space above the water, a filter operatively connected between said tanks through which water from the raw water tank is filtered and passed into the repression tank, a shut-off valve in the connection between the raw water tank and the filter, a back-wash line connected with the water inlet end of the filter, a shut-off valve in said back-wash line, a service pipe connected to the water space of said repression tank, and an air pressure equalizing line with shut-off valve for connecting the air spaces of said tanks together.

3. In a water system, two pneumatic pressure tanks, each having an air space at the top, means for delivering air and water into the first of said tanks, a service pipe line for conveying water from the second of said tanks, a filter having an intake end, a pipe for conveying water from the first tank to the filter, a shut-off valve in said pipe, a pipe for conveying filtered water from the filter to the second tank, a back-wash line connected with the intake end of the filter, a shut-off valve in said back-wash line, and means for equalizing the air pressure in said tanks when the valve between the first tank and the filter is closed and the valve in the back-wash waste line is opened, the last-named means comprising an air pressure equalizing line connecting the air spaces of said tanks together, and a normally closed shut-off valve in said air pressure equalizing line.

4. In an iron removal system, a raw water storage tank having a compressed air space above the water level in the tank, a repression tank having a water space and also having a compressed air space above the water level in that tank, a water service line connected to the water space of said repression tank, a back check valve in said water service line, a water supply pipe for delivering water and air under pressure into the air space of said raw water tank, a filter, a pipe for conveying water from the water space of said raw water tank into the filter, a pipe for conveying the filtered water from the filter into the water space of the repression tank, a back-wash line connected to the pipe which conveys the water from the raw water tank to the filter, a shut-off valve in said back-wash line, another shut-off valve in the pipe between the raw water tank and the place of connection therewith of said back-wash lines, an air pressure equalizing line connecting the air space of the raw water tank with the air space of the repression tank, and a shut-off valve in said air pressure equalizing line.

5. In a system of the class described, the combination, comprising a source of water and air under pressure, a compressed air raw-water tank having an air space above the water, a pipe connecting said source with said raw-water tank, a compressed air repression tank having an air space above the water, a filter operatively connected between said tanks through which water from the raw-water tank is filtered and passed into the repression tank, a shut-off valve in the connection between the raw-water tank and the filter, a back-wash line connected with the water inlet end of the filter, a shut-off valve in said back-wash line, a service pipe connected to the water space of said repression tank, and an air pressure equalizing line connecting the air spaces of said tanks together, and means for controlling the passage of air through said air pressure equalizing line.

6. In a water system, two pneumatic pressure tanks each having an air space at the top, means for delivering water and air under pressure into the first tank, a service line conveying water from the second tank, a filter having an inlet side and an outlet side, means including a shut-off valve for conducting the water from the first tank to the inlet side of the filter, means for conveying the water from the outlet side of the filter into the second tank, means for back-washing the filter, the last named means including a back-wash waste line communicating with the inlet side of the filter, a shut-off valve controlling flow through said back wash waste line, and means effecting communication between the air spaces of the two tanks whereby air may flow from the first tank to the second tank and replace the water flowing out of the second tank while the back-washing takes place.

7. In a closed system of water purification, a raw water storage tank and a repression tank each having a water space and an air cushion space above the water in the respective tanks, a filter having an inlet side connected to said raw water storage tank and having an outlet side connected to said repression tank, a service pipe line connected with said repression tank, means for forcing water and air into said raw water storage tank above the water level therein and establishing in said raw water tank a sufficient pressure to force water through said filter and into said repression tank against the air cushion therein and store up a supply of water in each of said tanks, means for closing off the flow of water from the raw water tank to the filter and means including an air line connecting the air spaces of the two tanks together and including a normally closed back-wash outlet from the filter for effecting a back wash of the filter by the water in the repression tank after having first closed off the flow from the raw water tank to the filter and having opened said back wash outlet.

8. In a closed system of water purification, a raw water storage tank and a repression tank each having a water space and an air cushion space above the water in the respective tanks, a filter having an inlet side operatively connected to said raw water storage tank and having an outlet side operatively connected to said repression tank, a service pipe-line connected to the lower part of said repression tank, means for delivering water and air under pressure into said raw water storage tank and establishing in said raw water storage tank a sufficient pressure to force water through said filter and into said repression tank against the air cushion therein and also to store up water in each of said tanks, an air line connection from the air space of the raw water storage tank to the air space of the repression tank, means for controlling the passage of air through said air line, and a normally closed back wash outlet for the filter, all being arranged whereby under normal operation of the apparatus when water is being withdrawn through said service pipe-line the rate of flow of water from the raw water tank through the filter into the repression tank will be less than the outflow from the repression tank, regardless of the rate at which water is being delivered into the raw water tank or withdrawn from the repression tank.

JOSEPH P. LAWLOR.